(12) United States Patent
Mizukami et al.

(10) Patent No.: US 11,640,337 B2
(45) Date of Patent: May 2, 2023

(54) DATA RECOVERY OF DISTRIBUTED DATA USING REDUNDANT CODES

(71) Applicant: Hitachi, Ltd., Tokyo (JP)

(72) Inventors: Kazuki Mizukami, Tokyo (JP); Hiroaki Miyata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/471,332

(22) Filed: Sep. 10, 2021

(65) Prior Publication Data

US 2022/0206897 A1    Jun. 30, 2022

(30) Foreign Application Priority Data

Dec. 24, 2020    (JP) .............................. JP2020-215659

(51) Int. Cl.
| | |
|---|---|
| *G06F 11/10* | (2006.01) |
| *G06F 11/00* | (2006.01) |
| *G06F 3/06* | (2006.01) |
| *G06F 3/00* | (2006.01) |

(52) U.S. Cl.
CPC .......... *G06F 11/1076* (2013.01); *G06F 3/067* (2013.01); *G06F 3/0619* (2013.01); *G06F 3/0659* (2013.01)

(58) Field of Classification Search
CPC .. G06F 11/1076; G06F 3/0619; G06F 3/0659; G06F 3/067
See application file for complete search history.

(56) References Cited

U.S. PATENT DOCUMENTS

| | | | | |
|---|---|---|---|---|
| 7,562,188 | B2* | 7/2009 | Cavallo | G06F 11/1076 |
| | | | | 714/E11.088 |
| 8,533,155 | B2* | 9/2013 | Pinkney | G06F 11/2094 |
| | | | | 707/661 |
| 9,026,729 | B1* | 5/2015 | Hallak | G06F 3/0689 |
| | | | | 711/114 |
| 10,459,638 | B2 | 10/2019 | Yamamoto et al. | |
| 2006/0288161 | A1* | 12/2006 | Cavallo | G06F 11/1076 |
| | | | | 714/E11.034 |
| 2009/0113235 | A1* | 4/2009 | Selinger | G06F 11/108 |
| | | | | 711/E12.001 |

FOREIGN PATENT DOCUMENTS

| | | |
|---|---|---|
| JP | 6547057 B2 | 7/2019 |
| WO | 2017/145223 A1 | 8/2017 |

* cited by examiner

*Primary Examiner* — Justin R Knapp
(74) *Attorney, Agent, or Firm* — Mattingly & Malur, PC

(57) ABSTRACT

User data and redundant codes are stored in a distributed manner, and data is read while suppressing performance degradation due to the occurrence of a failure. If a first node in a distributed storage system receives a read request from a host to read the user data when a storage device of its own node is blocked, the first node executes a first collection read request which requests recovery of data from the secondary redundant code corresponding to target data of the read request; and if at least part of the target data has failed to be recovered according to the first collection read request, regarding insufficient data among a plurality of pieces of data which are necessary to recover the target data by using the primary redundant code, the first node executes a second collection read request which requests recovery of the insufficient data from the secondary redundant code.

8 Claims, 16 Drawing Sheets

FIG. 8

② COLLECTION READ REQUEST
Node:A1 → Node:A6, A5, A4 (SECONDARY CODE READING)   350

|     |   | A1 | A2 | A3 | A4 | A5 | A6 |
|-----|---|----|----|----|----|----|----|
| D1  |   | S1 | S2 | S3 | S4 | S5 | S6 |
| D2  |   | S6 | S1 | S2 | S3 | S4 | S5 |
| D3  |   | S5 | S6 | S1 | S2 | S3 | S4 |
| D4  |   | S4 | S5 | S6 | S1 | S2 | S3 |
| C1  |   | S3 | S4 | S5 | S6 | S1 | S2 |
| C2  | P | S2 | S3 | S4 | S5 | S6 | S1 |
|     | Q |    |    |    |    |    |    |

FIG. 10

④ FAILED COLLECTION READING OF "A1D1: S1"
→ Node:A6 FAILURE (TWO-POINT FAILURE) OF NODE A6 IS RECOGNIZED

350

|    |   | A1 | A2 | A3 | A4 | A5 | A6 |
|----|---|----|----|----|----|----|----|
| D1 |   | S1 | S2 | S3 | S4 | S5 | S6 |
| D2 |   | S6 | S1 | S2 | S3 | S4 | S5 |
| D3 |   | S5 | S6 | S1 | S2 | S3 | S4 |
| D4 |   | S4 | S5 | S6 | S1 | S2 | S3 |
| C1 |   | S3 | S4 | S5 | S6 | S1 | S2 |
| C2 | P | S2 | S3 | S4 | S5 | S6 | ✕ |
|    | Q |    |    |    |    |    |    |

DATA RECOVERY OF DISTRIBUTED DATA USING REDUNDANT CODES

CROSS-REFERENCE TO RELATED APPLICATION

The present application claims priority from Japanese application JP 2020-215659, filed on Dec. 24, 2020, the contents of which is hereby incorporated by reference into this application.

TECHNICAL FIELD

The present invention relates to a distributed storage system, a data recovery method, and a data processing program and is suited for application to a distributed storage system, data recovery method, and data processing program for storing user data and redundant codes in a distributed manner and recovering the data by using the redundant codes at the occurrence of a failure.

BACKGROUND ART

There has conventionally known a distributed storage system which protects data by storing user data and redundant codes for the user data by distributing them to a plurality of computer nodes. With such a distributed storage system, upon recovery of the data from a computer node where a failure has occurred, the data in the computer node where the failure has occurred is recovered from the redundant code and is distributed to, and stored in, each of the other computer nodes which are active.

Then, PTL 1 discloses a technology for enhancing the performance of the distributed storage system which stores the user data and the redundant codes in the distributed manner as described above. More specifically, a computer system disclosed in PTL 1 which stores user data and redundant codes in the distributed manner generates group information indicating positions of user data areas and redundant code areas in a plurality of computers; and when each computer receives a write request to write data, the computer writes the write data to its local storage device, selects a transfer destination computer from other computers on the basis of the group information, and transmits transfer data based on the write data to the transfer destination computer; and when each computer receives a plurality of pieces of the transfer data from the plurality of other computers, respectively, the computer generates a redundant code from the plurality of pieces of the transfer data on the basis of the group information and writes the redundant code to the local storage device; and if the configuration of the plurality of computers is changed, each computer changes the group information on the basis of the changed configuration.

CITATION LIST

Patent Literature

PTL 1: Japanese Patent No. 6547057

SUMMARY OF THE INVENTION

Problems to be Solved by the Invention

However, the above-described PTL 1 merely discloses a fundamental explanation about the procedures for recovering the data by using a secondary redundant code when a two-point failure has occurred at two computer nodes. Upon implementation of the distributed storage system, it is required to recover and read the data at high speed in response to a large amount of read requests even at the time of failures of the plurality of computers nodes; however, PTL 1 does not disclose a control method for processing for placing the redundant codes corresponding to such implementation and recovering the data. Specifically speaking, for example, when the distributed storage system is implemented by using a stripe mapping table (or stripe map) disclosed in PTL 1, there is a possibility that when a read request is made at the time of the occurrence the two-point failure where even the storage device of the secondary redundant code is also blocked, the number of collection read requests may become several times as many as the number of collection read requests at the occurrence of a one-point failure and the node failure may cause significant performance degradation in a state of degraded redundancy.

The present invention was devised in consideration of the above-described circumstances and aims at proposing a distributed storage system, a data recovery method, and a program which are capable of reading data while suppressing performance degradation, in the distributed storage system which stores the user data and the redundant codes in a distributed manner even when the redundancy has degraded due to the occurrence of a failure.

Means to Solve the Problems

In order to solve the above-described problems, provided according to an aspect of the present invention is a distributed storage system for distributing data to, and saving the data at, a plurality of nodes coupled together via a network, wherein each node of the plurality of nodes includes a processor for controlling data I/O, and a cache and a storage device for storing data; wherein when receiving a write request from a host, a first node of the plurality of nodes: generates a primary redundant code on the basis of a plurality of pieces of user data received together with the write request; and transmits the generated primary redundant code and the plurality of pieces of user data used to generate the primary redundant code to other respectively different nodes of the plurality of nodes and stores the plurality of pieces of the received user data in the storage device of its own node; wherein a second node of the plurality of nodes: generates a secondary redundant code on the basis of the plurality of pieces of user data and the primary redundant code which are received respectively from the plurality of the other nodes among the plurality of nodes; and stores the generated secondary redundant code in the storage device of its own node and saves the primary redundant code, which is used to generate the secondary redundant code, in the cache of its own node; wherein each node of the plurality of nodes has functions as the first node and the second node; wherein if the first node receives a read request from the host to read the user data when the storage device of its own node is blocked, the first node executes a first collection read request, which requests recovery of data from the secondary redundant code, with respect to one or more of the other nodes which store the secondary redundant code corresponding to target data of the read request in the storage device; and wherein if at least part of the target data has failed to be recovered according to the first collection read request, regarding one or more pieces of insufficient data excluding data already recovered by the first collection read request among a plurality of pieces of data that are necessary to recover the target data, which failed to be recovered, by using the primary redundant code, the first node executes a second collection read request, which requests data recovery from the secondary redundant code, with respect to one or more of the other nodes which store, in the storage device, the secondary redundant code corresponding to the insufficient data.

Furthermore, In order to solve the above-described problems, provided according to an aspect of the present invention is a data recovery method by a distributed storage system for distributing data to, and saving the data at, a plurality of nodes coupled together via a network, wherein each node of the plurality of nodes includes a processor for controlling data I/O, and a cache and a storage device for storing data; wherein when receiving a write request from a host, a first node of the plurality of nodes: generates a primary redundant code on the basis of a plurality of pieces of user data received together with the write request; and transmits the generated primary redundant code and the plurality of pieces of user data used to generate the primary redundant code to other respectively different nodes of the plurality of nodes and stores the plurality of pieces of the received user data in the storage device of its own node; wherein a second node of the plurality of nodes: generates a secondary redundant code on the basis of the plurality of pieces of user data and the primary redundant code which are received respectively from the plurality of the other nodes among the plurality of nodes; and stores the generated secondary redundant code in the storage device of its own node and saves the primary redundant code, which is used to generate the secondary redundant code, in the cache of its own node; wherein each node of the plurality of nodes has functions as the first node and the second node; wherein if the first node receives a read request from the host to read the user data when the storage device of its own node is blocked, the first node executes a first collection read request, which requests recovery of data from the secondary redundant code, with respect to one or more of the other nodes which store the secondary redundant code corresponding to target data of the read request in the storage device; and wherein if at least part of the target data has failed to be recovered according to the first collection read request, regarding one or more pieces of insufficient data excluding data already recovered by the first collection read request among a plurality of pieces of data that are necessary to recover the target data, which failed to be recovered, by using the primary redundant code, the first node executes a second collection read request, which requests data recovery from the secondary redundant code, with respect to one or more of the other nodes which store, in the storage device, the secondary redundant code corresponding to the insufficient data.

Furthermore, In order to solve the above-described problems, provided according to an aspect of the present invention is a data processing program to be executed by a plurality of nodes in a distributed storage system for distributing data to, and saving the data at, the plurality of nodes coupled together via a network, wherein each node of the plurality of nodes includes a processor for controlling data I/O, and a cache and a storage device for storing data; wherein when receiving a write request from a host, the data processing program causes a first node of the plurality of nodes to execute processing for: generating a primary redundant code on the basis of a plurality of pieces of user data received together with the write request; and transmitting the generated primary redundant code and the plurality of pieces of user data used to generate the primary redundant code to other respectively different nodes of the plurality of nodes and storing the plurality of pieces of the received user data in the storage device of its own node; wherein the data processing program causes a second node of the plurality of nodes to execute processing for: generating a secondary redundant code on the basis of the plurality of pieces of user data and the primary redundant code which are received respectively from the plurality of the other nodes among the plurality of nodes; and storing the generated secondary redundant code in the storage device of its own node and saving the primary redundant code, which is used to generate the secondary redundant code, in the cache of its own node; wherein if the first node receives a read request from the host to read the user data when the storage device of its own node is blocked, the data processing program causes the first node to execute processing for executing a first collection read request, which requests recovery of data from the secondary redundant code, with respect to one or more of the other nodes which store the secondary redundant code corresponding to target data of the read request in the storage device; and wherein if at least part of the target data has failed to be recovered according to the first collection read request, regarding one or more pieces of insufficient data excluding data already recovered by the first collection read request among a plurality of pieces of data that are necessary to recover the target data, which failed to be recovered, by using the primary redundant code, the data processing program causes the first node to execute processing for executing a second collection read request, which requests data recovery from the secondary redundant code, with respect to one or more of the other nodes which store, in the storage device, the secondary redundant code corresponding to the insufficient data.

Advantageous Effects of the Invention

According to the present invention, the distributed storage system which stores the user data and the redundant codes in the distributed manner can read the data while suppressing the performance degradation even when the redundancy has degraded due to the occurrence of a failure.

BRIEF DESCRIPTION OF DRAWINGS

FIG. 8 is a diagram (2) for explaining a transition in the data processing when receiving the read request astride the blocks at the time of the two-point failure;

FIG. 10 is a diagram (4) for explaining a transition in the data processing when receiving the read request astride the blocks at the time of the two-point failure;

DESCRIPTION OF EMBODIMENTS

Figure 1:
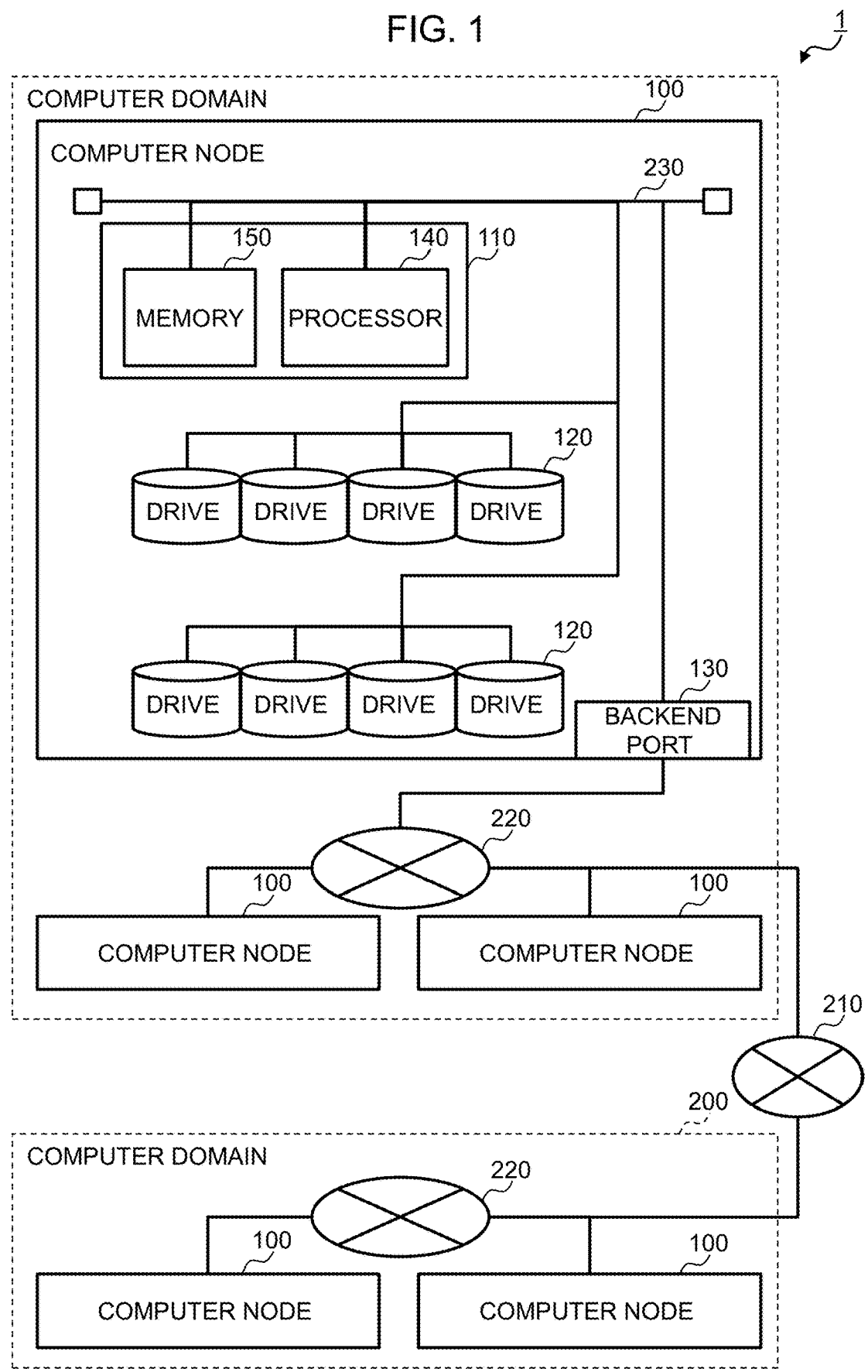
FIG. 1 is a block diagram illustrating a configuration example of a distributed storage system according to one embodiment of the present invention.

Embodiments of the present invention will be explained below with reference to the drawings.

Incidentally, in the following description, various kinds of information may sometimes be explained by using expressions such as a "table(s)" and a "list(s)"; however, the various kinds of information may be expressed with a data structure other than the data structures mentioned above. The expression "XX information" is sometimes used to indicate, for example, "XX table" and "XX list" in order to indicate that the various kinds of information do not depend on the data structure. Expressions such as "identification information," an "identifier(s)," a "name(s)," an "ID(s)," and a "number(s)" may be used to explain the details of each piece of information; however, these expressions can be replaceable with each other. Furthermore, when elements of the same type are explained without distinguishing one from another, a common reference numeral is used for the explanation; and when the elements of the same type are explained by distinguishing one from another, such elements are sometimes explained by adding different additional characters to the common reference numeral.

Furthermore, in the following description, processing is sometimes described by referring to a "program" as a subject; however, the program may be considered as processing by a processor (such as a CPU [Central Processing Unit]) because the program is executed by the processor to execute defined processing by using storage resources (such as a memory) and/or an interface device (such as a communication port), etc. as appropriate. The processing explained by referring to the program as its subject may be considered as processing executed by the processor or an apparatus or system having that processor. Furthermore, the processor may include a hardware circuit for executing a part or whole of the processing. The program may be installed from a program source into a device like a computer. The program source may be, for example, a program distribution server or a storage medium which can be read by a computer. When the program source is a program distribution server, the program distribution server may include a processor (such as a CPU) and storage resources; and the storage resources may further store a distribution program and a distribution target program. Then, as the processor of the program distribution server executes the distribution program, the processor of the program distribution server may distribute the distribution target program to other computers. Furthermore, in the following description, two or more programs may be implemented as one program or one program may be implemented as two or more programs.

(1) System Configuration

FIG. 1 is a block diagram illustrating a configuration example of a distributed storage system according to one embodiment of the present invention. A distributed storage system 1 is composed of a plurality of computer nodes 100, each of which includes storage devices (drives 120). The plurality of computer nodes 100 are coupled to each other via networks 210, 220 and communicate with each other. The distributed storage system 1 creates a storage pool with the storage devices (the drives 120) of the plurality of computer nodes 100 and implements a virtual storage system by using the storage pool.

In the distributed storage system 1 according to this embodiment, each of one or more arbitrary computer nodes 100 forms a computer domain 200. The computer domain 200 may be made to correspond to, for example, geographical areas or correspond to a topology of a virtual or physical backend network (the network 220). The respective computer domains 200 are coupled together by an external network (the network 210). In the following explanation, it is assumed that each computer domain 200 is associated with one of a plurality of sites which are geographically separated from each other.

The computer node 100 has, for example, the configuration of a general server computer; however, there is no particular limitation on its hardware configuration. The computer node 100 is coupled via the backend network (the network 220) to another computer node 100 through a backend port 130. In the case of FIG. 1, the computer node 100 includes a processor package 110, the drives 120, and the backend port 130; and they are coupled to each other via an internal network (a network 230).

The processor package 110 includes a processor 140 (for example, a CPU) and a memory 150. The memory 150 stores programs to be executed by the processor 140. The memory 150 may be a volatile DRAM (Dynamic Random Access Memory), a nonvolatile SCM (Storage Class Memory), or the like. Data stored in the memory 150 will be described later with reference to FIG. 2.

The drives 120 are storage devices which stores data such as stripes. The drives 120 provide storage areas for the storage pool by using one or the plurality of drives 120 which extend over one or more computer nodes 100 as described earlier, other than storing data as local drives of each computer node 100. The drives 120 are, specifically, for example, HDDs (Hard Disk Drives), SSDs (Solid State Drives), or the like having interfaces of FC (Fibre Channel), SAS (Serial Attached SCSI), SATA (Serial Advanced Technology Attachment), or the like. An SCM of NAND, PRAM (Parameter RAM), ReRAM (Resistive RAM), or the like, or a volatile memory may be used as the drive 120. When the volatile memory is used as the drive 120, the storage devices may be caused by a battery to become nonvolatile.

Incidentally, in this embodiment, the storage devices may be a storage drive configured of one or more HDDs, SSDs, or the like, or may be a RAID apparatus including a plurality of storage drives, or a plurality of RAID apparatuses.

A stripe(s) (stripe data) is a data unit which is a source to generate a redundant code for data protection. The stripe(s)

may sometimes be called user data in order to be distinguished from the redundant code. The stripe(s) is stored in the storage devices (the drives 120) in the computer node 100 and is also used to generate a redundant code in another computer node 100. Incidentally, in the following explanation, the "computer node" may be sometimes called the "node" for the simplification purpose.

Figure 2:
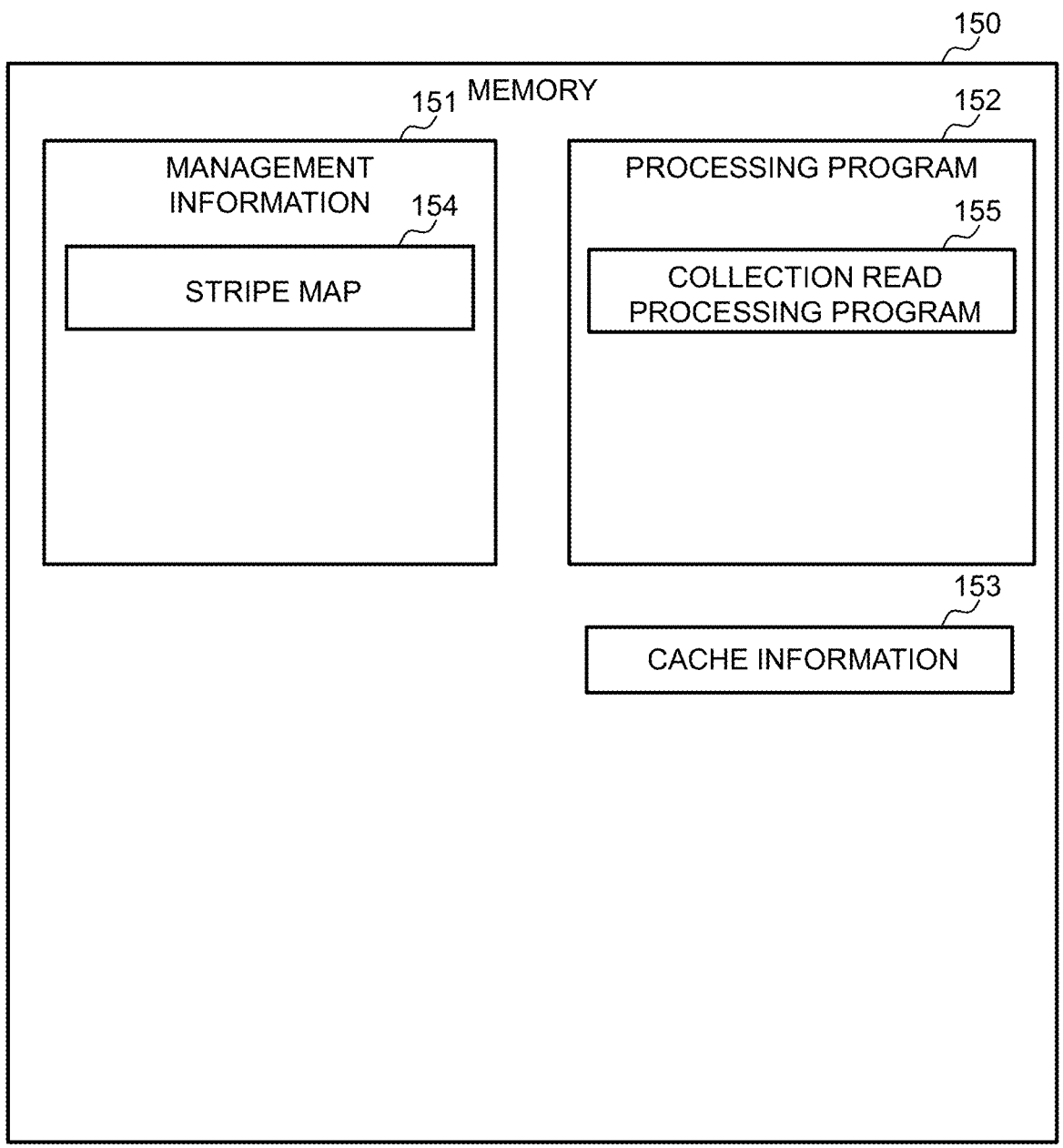
FIG. 2 is a block diagram illustrating data stored in a memory 150.

FIG. 2 is a block diagram illustrating data stored in the memory 150. FIG. 2 illustrates information for controlling the distributed storage system 1 among the data (including programs) stored in the memory 150. The memory 150 stores various kinds of programs including an OS (Operation System) and an interface program in addition to management information 151, processing program 152, and cache information 153 illustrated in FIG. 2. Furthermore, the memory 150 sometimes stores application programs for carrying out business operations.

The management information 151 is information for managing the data protection and includes a stripe map 154 for managing mapping of stripes. The processing program 152 is a storage program for managing storage I/O to the drives 120. The processing program 152 implements, for example, a function that gathers and virtualizes the drives 120, which are hardware resources, and provides them as virtual volumes to other virtual machines via a hypervisor. Furthermore, for example, the processing program 152 causes the hypervisor to recognize the virtual volumes as iSCSI targets (the drives 120) and thereby mounts such virtual volumes in the hypervisor and provides such drives (virtual volumes) to other virtual machines. Furthermore, for example, the processing program 152 communicates with a host and the processing program 152 which operates in another computer node 100, via a network path and implements a storage function that performs, for example, the data protection and the data migration. The processing program 152 has a collection read processing program 155 for executing collection reading as one program which implements such a storage function. Its detailed processing sequence will be described later, but the collection reading is processing for a node which stores a redundant code to read write data, which is required for recovery of the data, from another node and recover the data by using the redundant which itself retains. Then, the cache information 153 is information about a cache of the processing program 152.

In the distributed storage system 1, a computer node 100 which has received a write request or a read request from the host executes the specified processing program 152 and performs the storage I/O. The host is a computer node 100, a processor which operates at that computer node 100, or an application program executed by that processor.

(2) Data Protection Method

A data protection method for the distributed storage system 1 will be explained below by taking a specific example of the data protection method.

Figure 3:
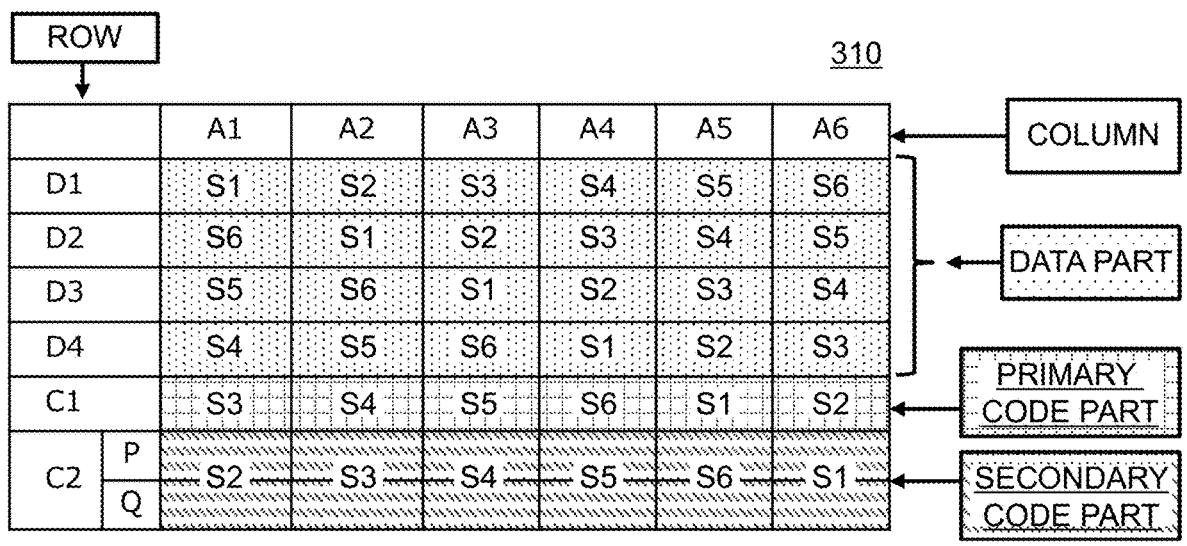
FIG. 3 is a diagram for explaining data placement example of a stripe map and a chunk group.
Figure 3:
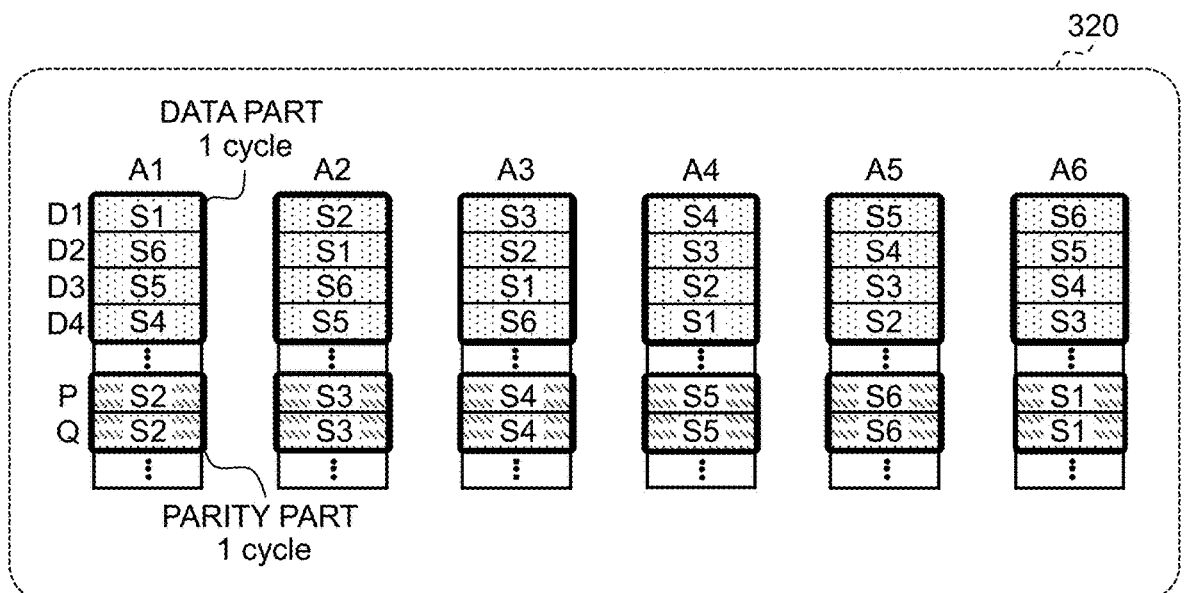

FIG. 3 is a diagram for explaining a data placement example of a stripe map and a chunk group. Referring to FIG. 3, a stripe map 310 is indicated in an upper portion of the drawing and an image of a physical chunk 320 stored in a local drive (the drive 120) of the node 100 is indicated in a lower portion of the drawing.

In the distributed storage system 1, for example, a chunk group is divided by columns and rows in one-block units and is then mapped as illustrated in the stripe map 310 in FIG. 3. Specifically speaking, regarding the stripe map 310, each column corresponds to a node 100 and each row corresponds to storage blocks in one-block units in each node 100.

The stripe map 310 is data mapping for protecting data with the configuration in which the distributed storage system 1 having six nodes of nodes A1 to A6 generate primary and secondary redundant data (C1, C2) from four pieces of user data (D1 to D4). Specifically speaking, when D represents the number of pieces of data (the number of stripes) and P represents the number of parities (the number of redundant codes), the data protection configuration illustrated in FIG. 3 can be called a 4D2P configuration. Since the distributed storage system 1 has a 2P redundancy configuration, it realizes the redundancy (double redundancy) capable of recovering all the pieces of data not only upon the occurrence of a one-node failure (one-point failure), but also a two-node failure (two-point failure).

D1 to D4 in the stripe map 310 are areas for storing the user data (data part) and have a four-stripe size. On the other hand, as areas for storing the redundant codes, there are C1 (a primary code part) for storing a primary parity (a primary code or a primary redundant code) and C2 (a secondary code part) for storing a secondary parity (a secondary code or a secondary redundant code). The secondary parity is generated by, for example, an EC (Erasure Coding) operation as described later; and since the result of the EC operation becomes a size of approximately two blocks, the secondary parity is divided into, and stored in, P and Q. Therefore, C2 has the size of two stripes P and Q. Since C1 is stored in the cache (buffer), it is not indicated in the illustration of the physical chunk 320. Then, at the local drive (the drive 120), each of the data part (D1 to D4) and the secondary code part (P, Q) is repeatedly stored with respect to a pool volume address in every cycle number as illustrated in the physical chunk 320.

A stripe type is a class of stripes for which a redundant code(s) is generated. One or a plurality of redundant codes are generated from a plurality of stripes in a stripe type. A stripe is a data unit of a predetermined size. For example, in the case of the stripe map 310 in FIG. 3, one piece of write data is divided into user data of six data blocks (for example, S1 to S6), among which four data blocks are stored as D1 to D4 in one node 100. Furthermore, two redundant codes C1, C2 are generated and respectively stored in different nodes 100.

With the distributed storage system 1 according to this embodiment, under the condition that a plurality of the same stripe types are not placed in the same node, the number of stripes and the number of redundant codes can be designed arbitrarily. The primary redundant code C1 is generated by, for example, XOR of D1 to D4 of the same column (the same node). Furthermore, the secondary redundant code C2 is generated by, for example, performing the EC operation on the data D1 to D4 and the primary redundant code C1 of the same stripe.

In light of the features of the above-explained data placement, for example, mapping at the node A1 in the stripe map 310 of the 4D2P configuration is designed so that S1, S6, S5, and S4 are mapped in the data part (D1 to D4), S3 is mapped in the primary code part C1, and S2 is mapped in the secondary code part C2 (P, Q). Then, as indicated in the physical chunk 320, the stripes of the data part are stored in the drive 120 for the node A1 continuously in one-cycle units and the stripes of the secondary code part (the parity part) are also separately stored continuously in one-cycle units.

Figure 4:
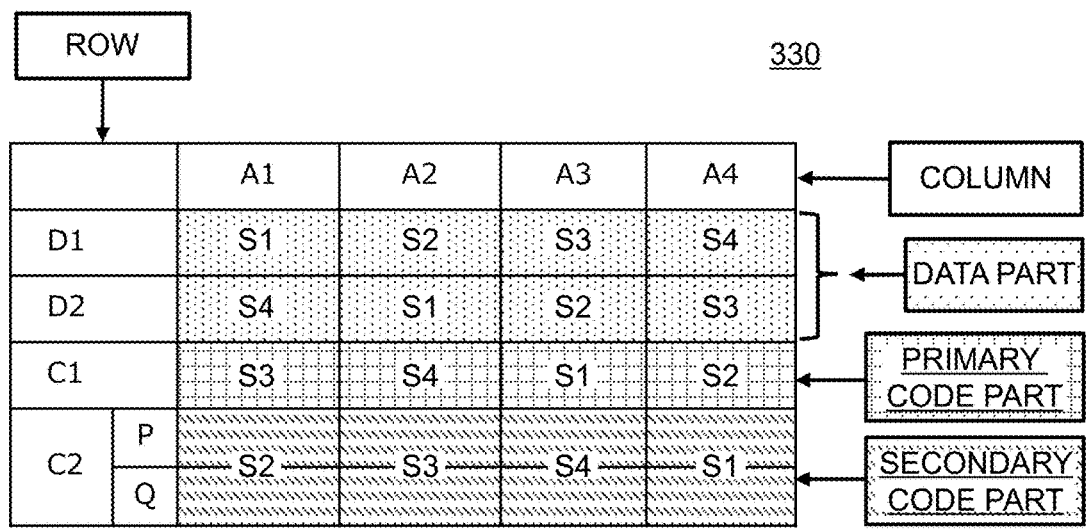
FIG. 4 is a diagram illustrating an example of a stripe map having a 2D2P structure.
Figure 5:
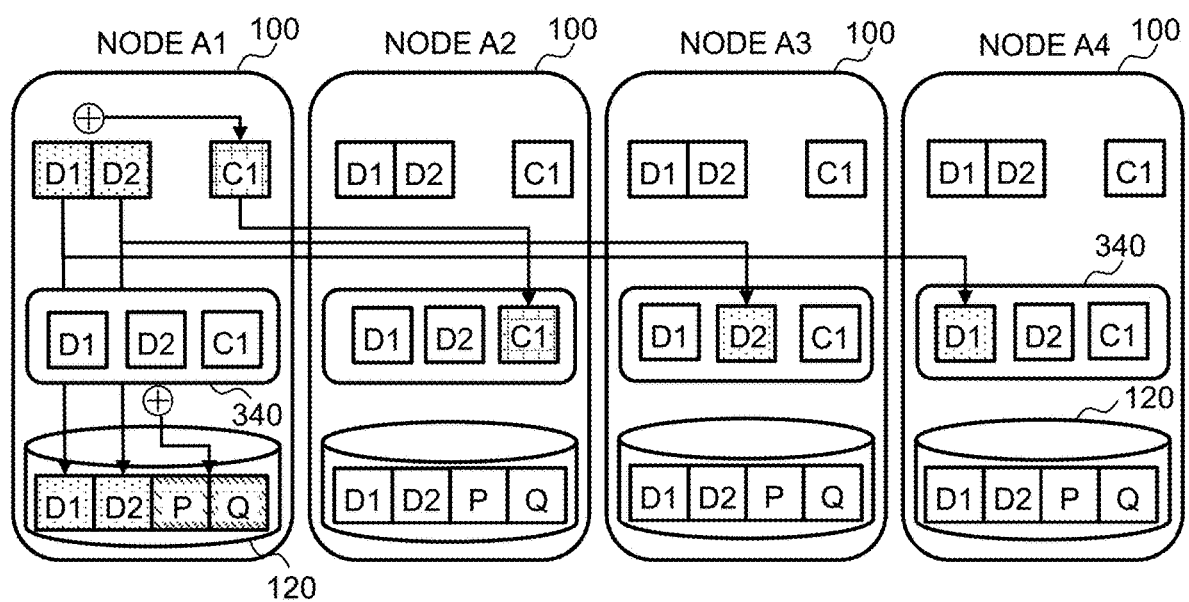
FIG. 5 is a diagram for explaining an image of write data and data protection.

Next, an explanation will be provided about redundancy processing in response to a write request in the distributed storage system 1 with reference to FIG. 4 and FIG. 5 by taking an example of a 2D2P configuration which is simpler than the aforementioned 4D2P configuration.

FIG. 4 is a diagram illustrating an example of a stripe map having the 2D2P structure. The difference in the configuration of a stripe map 330 illustrated in FIG. 4 from the stripe map 310 illustrated in FIG. 3 is that the number of nodes to which the data is distributed is four, A1 to A4, and there are two pieces of data as the stripe size in the data part (D1, D2). Therefore, according to the stripe map 330, the distributed storage system 1 divides one piece of write data into the user data S1 to S4 of four data blocks and places them in four nodes A1 to A4. At each node, two of the four pieces of the user data are stored in the data part (D1, D2) and, furthermore, the primary redundant code is stored in the primary code part (C1), and the secondary redundant code is stored in the secondary code part (C2). Furthermore, each node is designed under the condition that a plurality of the same stripe types are not placed at the same node.

FIG. 5 is a diagram for explaining an image of data protection of write data. FIG. 5 illustrates an example in which when the distributed storage system 1 has four nodes A1 to A4, write data is protected with the double redundancy configuration of 2D2P on the basis of the stripe map 330 in FIG. 4.

For example, when the node A1 receives write data of a long data length as illustrated in FIG. 5, the node A1 (the processor 140) divides the write data into the user data D1, D2 of two blocks. Under this circumstance, specifically speaking, the user data D1 of the node A1 is "S1" and the user data D2 of the node A1 is "S4" according to the stripe map 330. Incidentally, the relationship between a column and row, and stored data in the stripe map may be hereinafter sometimes expressed in a simplified manner like "A1 D1: S1" and "A1 D2: S4." Furthermore, the node A1 generates the primary redundant code C1 by performing XOR of the user data D1, D2. Next, the node A1 performs distributed copying of the user data D1, D2 and the primary redundant code C1 to caches (buffers) for other nodes A2 to A4. The data unit is a combination of one or a plurality of data blocks.

In the example of FIG. 5, specifically speaking, the node A1 divides the received write data into the user data of two data blocks D1 (A1 D1: S1), D2 (A1 D2: S4) and generates the primary redundant code C1 (A1 C1: S3) from these pieces of the user data. Similarly, the node A2 divides the received write data into the user data of two data blocks D1 (A2D1: S2), D2 (A2D2: S1) and generates the primary redundant code C1 (A2C1: S4) from these pieces of the user data. Similarly, the node A3 divides the received write data into the user data of two data blocks D1 (A3D1: S3), D2 (A3D2: S2) and generates the primary redundant code C1 (A3C1: S1) from these pieces of the user data. Similarly, the node A4 divides the received write data into the user data of two data blocks D1 (A4D1: S4), D2 (A4D2: S3) and generates the primary redundant code C1 (A4C1: S2) from these pieces of the user data.

Then, each node A1 to A4 writes the divided user data D1, D2 to its own local drive (the drive 120) and performs distributed copying of three pieces of the data D1, D2, C1 to the caches (buffers) 340 of the other three nodes, respectively. Under this circumstance, the distributed copying is performed so that the data of the same stripe (for example, S2 in case of the node A1) will be integrated in the cache for each node A1 to A4. As a result, each node A1 to A4 stores the data blocks D1, D2, C1 of the same stripe in its cache from the other three nodes. Furthermore, each node A1 to A4 stores the primary redundant code C1, which it has generated, in a cache area different from the cache 340. This cache area will not be released even after the generation of the secondary redundant data.

Next, each of the node A1 to A4 asynchronously performs the EC operation of the data blocks which have been integrated in the cache 340 from the other three nodes, thereby generating the secondary redundant data C2 and writing it to the local drive (the drive 120). Since the secondary redundant data C2 has the length of approximately two blocks as described earlier, it is divided into P and Q and written to the local drive. After each node A1 to A4 generates the secondary redundant data at its own node and writes it to the local drive, it releases the cache 340.

In the example of FIG. 5, specifically speaking, for example, the node A1 integrates D1 (A2D1: S2) of the node A2, D2 (A3D2: S2) of the node A3, and C1 (A4C1: S2) of the node A4 into the cache 340, generates C2 (A1C2: S2) by performing the EC operation of these data blocks, divides the generated C2 into P and Q and writes them to the local drive, and releases the cache 340. As a result of the above, at the node A1, the local drive (the drive 120) stores D1 (A1D1: S1) and D2 (A1 D2: S4) which are obtained by the division at the node A1, and the secondary redundant data C2 (A1 C2: S2) generated by the cache 340 for the node A1; and the cache stores the primary redundant data C1 (A1 C1: S3) generated at the node A1. Although a detailed explanation is omitted, similar data processing is executed also at the nodes A2 to A4 and the data is placed in a distributed manner according to the mapping as illustrated in the stripe map 330.

The above-described data placement processing can be also described as follows. The node A1 which has received write data generates the primary redundant code (the primary code) from the plurality of pieces of user data, which are obtained by dividing the write data, and transmits the generated primary redundant code and the user data, which is used to generate this primary redundant code, to respectively different other nodes. Furthermore, the user data used to generate the primary redundant code is stored in the local drive 120 for the node A1. Furthermore, the node A1 generates the secondary redundant code (the secondary code) on the basis of a plurality of pieces of the user data and the primary redundant code, which are received respectively from the plurality of the other nodes, and stores this secondary redundant code in the drive 120 for the node A1. Furthermore, the primary redundant code used to generate the secondary redundant code is stored in the cache for the node A1. As the other nodes (the nodes A2 to A4) similarly execute such processing at the node A1, certain user data, the primary redundant code corresponding to that user data, and the secondary redundant code corresponding to that user data are distributed to, and stored in, the different nodes in the respective nodes of the distributed storage system 1.

As a result of the above-described execution of the data protection of the write data, the user data, the primary redundant code, and the secondary redundant code are distributed and placed at each of the nodes A1 to A4 so that a plurality of the same stripe types will not be placed at the same node; and, therefore, the nodes A1 to A4 have redundancy capable of recovering all pieces of data upon the occurrence of a two-node failure. Incidentally, also in the case of the 4D2P configuration, the data placement is performed according to the mapping of the stripe map 310, so that it is possible to realize the data recovery (double redundancy) upon the occurrence of a two-node failure in the same manner as in the case of the 2D2P configuration.

(3) Data Processing Upon Read Request

The distributed storage system 1 according to this embodiment can recover the data upon the occurrence of a failure of two nodes or less as described above. In other words, this means that it is possible to meet a data read request even upon the occurrence of the two-node failure. So, a detailed explanation will be provided below about data processing executed by the node 100 when a read request is made by the host in the distributed storage system 1 according to this embodiment, with reference to FIG. 6 and subsequent drawings.

Figure 6:
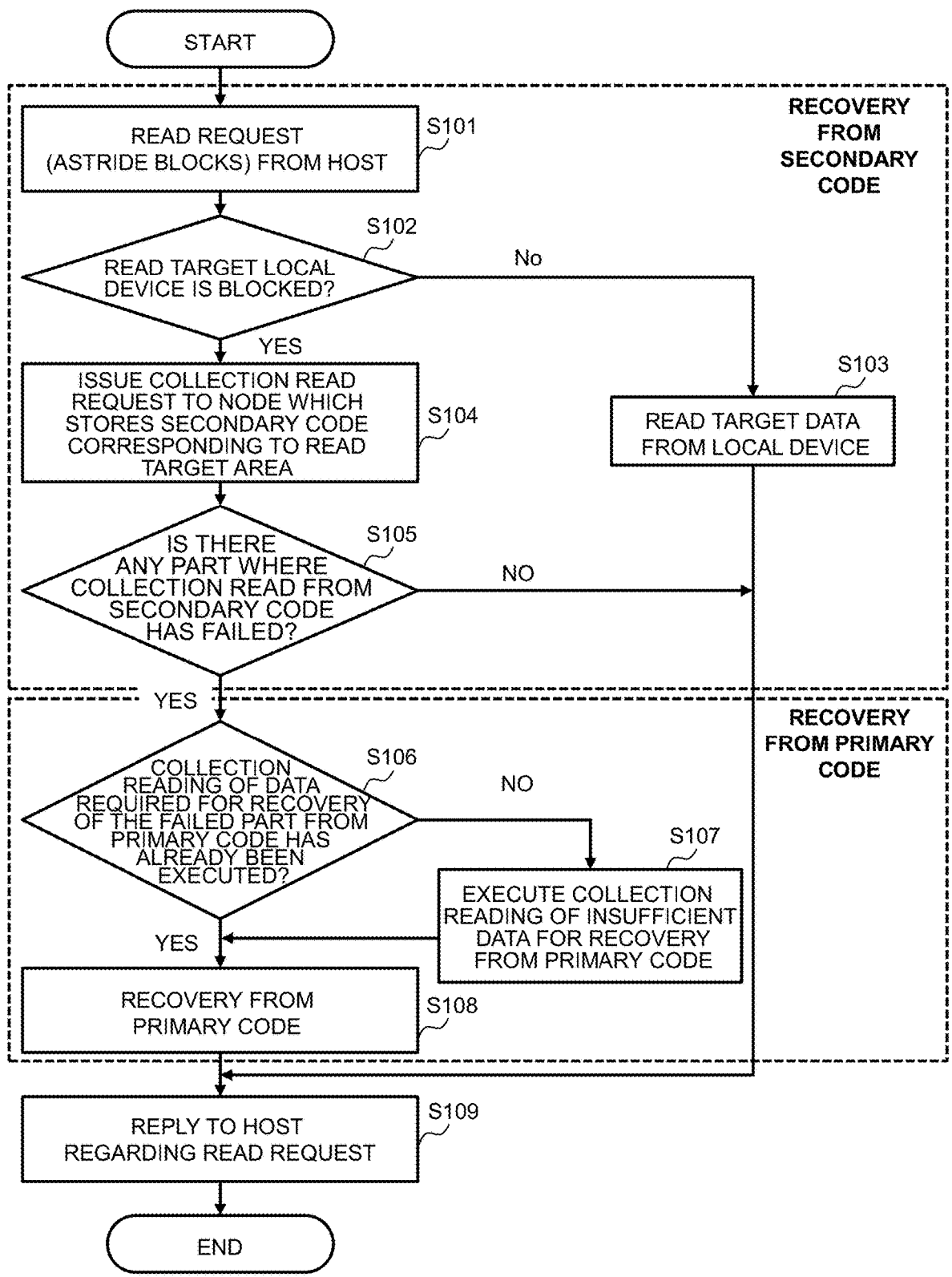
FIG. 6 is a flowchart illustrating a processing sequence example for data processing by a node 100 which has received a read request.

FIG. 6 is a flowchart illustrating a processing sequence example for data processing by a node 100 which has received a read request.

Referring to FIG. 6, the computer node 100 firstly receives a read request from the host (step S101). Incidentally, the read request received in step S101 can include a read request whose reading range extends over a plurality of blocks.

Next, the processing program 152 checks whether the local storage device (the drive 120) which stores read target data is in a blocked state or not (step S102). If it is determined in step S102 that the read target local device is not blocked (NO in step S102), the processing program 152 reads the target data from the read target local device (step S103), replies to the host regarding the read request (step S109), transmits the read data, and terminates the data processing.

On the other hand, if it is determined in step S102 that the read target local device is blocked (YES in step S102), the processing proceeds to step S104. Incidentally, although the illustration is omitted, if it is determined as YES in step S102, it is assumed that the maximum permissible number of blocked local devices is two. Upon the occurrence of a failure of three or more nodes in the distributed storage system 1, the data cannot be recovered. So, if three or more target local devices are blocked, the processing program 152 replies to the host by sending an error response to the read request without executing the processing in step S104, and then terminates the data processing.

In step S104, the processing program 152 issues a collection read request to each node 100 which stores the secondary code corresponding to a read target area in a blocked state. At each node 100 which receives the collection read request, the collection read processing program 155 performs collection reading to recover the data from the secondary code; and if the collection reading is executed successfully and the target data is recovered, the recovered target data is transmitted to a request source node 100 and is retained in a read buffer.

Next, the processing program 152 judges whether or not there is any part where the collection reading from the secondary code has failed as a result of the execution of the processing in step S104 (step S105). If in step S105 there is no part where the collection reading from the secondary code has failed (NO in step S105), the read target data is recovered by using the secondary code received from each node 100 and retained in the read buffer. Subsequently, the processing program 152 replies to the host regarding the read request (step S109), transmits the recovered data, and terminates the data processing.

On the other hand, if in step S105 there is the part where the collection reading from the secondary code has failed (YES in step S105), the processing proceeds to step S106 and is switched to the data recovery by using the primary code. In this embodiment, the data operation for the data recovery using the primary code is similar to the data operation by the collection reading upon the occurrence of the one-point failure. In step S106, the processing program 152 checks whether collection reading of data, which is required to recover the failed part of the collection reading from the secondary code, has already been executed or not. If the data exists, the collection reading of which has not been executed (NO in step S106), the processing proceeds to step S107; and if the collection reading of the data has already been executed (YES in step S106), the processing proceeds to step S108.

In step S107, the processing program 152 issues a collection read request to the node which stores the necessary data for the data recovery using the primary code (the necessary data the collection reading of which has not been executed yet). The node 100 which has received the collection read request causes the collection read processing program 155 to perform collection reading to recover the target data from the primary code; and if the collection reading has been executed successfully and the target data is recovered, the recovered target data is transmitted to the request source node 100 and is retained in the read buffer. After the termination of step S107, the processing proceeds to step S108.

Then, in step S108, the processing program 152 recovers the read target data, using the primary code, by using the data gathered in the read buffer by the processing which has been executed so far. Subsequently, the processing program 152 replies to the host regarding the read request (step S109), transmits the read target data which has been read or recovered by the processing executed until step S108 to the host, and then terminates the data processing.

As a result of the execution of the above-described data processing, when a read request astride a plurality of blocks is made upon the occurrence of a failure of two nodes or less, the distributed storage system 1 can recover the data from the secondary code; and regarding data which cannot be recovered from the secondary code, the distributed storage system 1 can deliver the target data of the read request to the request source by recovering the data from the primary code.

Incidentally, regarding the processing of the case where the read request astride the blocks is received, the distributed storage system 1 which executes the data processing as illustrated in FIG. 6 can reduce the number of collection read requests as compared to the conventional distributed storage system having the double-redundant redundancy; and, therefore, even in a state of degraded redundancy, it is possible to read (or recover) the data while suppressing the response performance degradation caused by collection reading. This issue will be explained below with reference to specific processing examples.

FIG. 7 to FIG. 13 are diagrams (1) to (7) for explaining transitions in the data processing when receiving a read request astride blocks at the time of the two-point failure.

Figure 7:
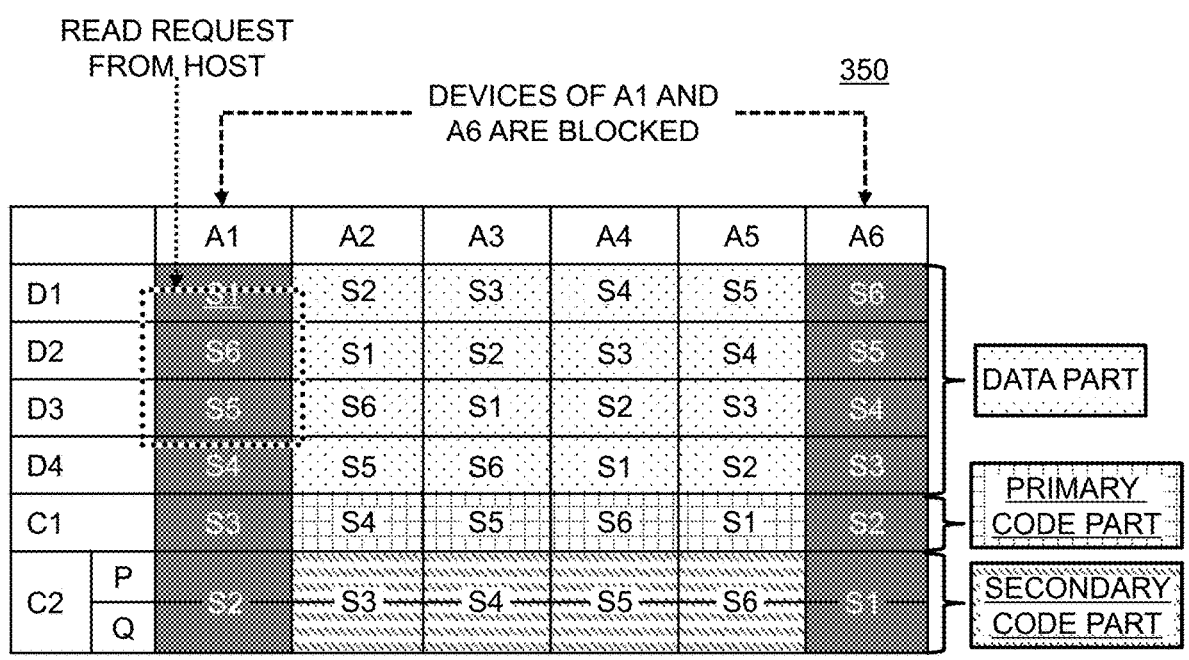
FIG. 7 is a diagram (1) for explaining a transition in data processing when receiving a read request astride blocks at the time of a two-point failure.

Firstly, FIG. 7 illustrates a stripe map 350 of the 4D2P configuration. Mapping of the stripe map 350 is the same as the mapping of the stripe map 310 explained in FIG. 3. FIG. 7 illustrates the state where the node A1 receives a read request from the host when the blocks from the data part to the secondary code part of the devices corresponding to the node A1 and the node A6 are blocked (upon the two-point failure). Incidentally, as illustrated in FIG. 7, the above-described read request is a read request astride the blocks and its target range extends from an intermediate part of A1 D1 to A1 D3 (regarding data, a latter half portion of S1, S6, and S5).

The state of FIG. 7 corresponds to steps S101 to S102 of the data processing in FIG. 6. In step S102, the device of the node A1 which is a read target local device is in a blocked state, so that it is determined as YES and the processing proceeds to step S104.

In step S104, the node which has received the read request issues collection read requests to other nodes which store the secondary codes corresponding to the read target areas in the blocked state as explained with reference to FIG. 6. FIG. 8 illustrates processing of the collection read requests in step S104. Specifically speaking, as illustrated in FIG. 8, the node A1 issues the collection read requests by means of the secondary codes respectively to the nodes A6, A5, A4 which store the secondary codes S1, S6, S5 corresponding to the read target areas (A1 D1, A1 D2, A1 D3).

Figure 9:
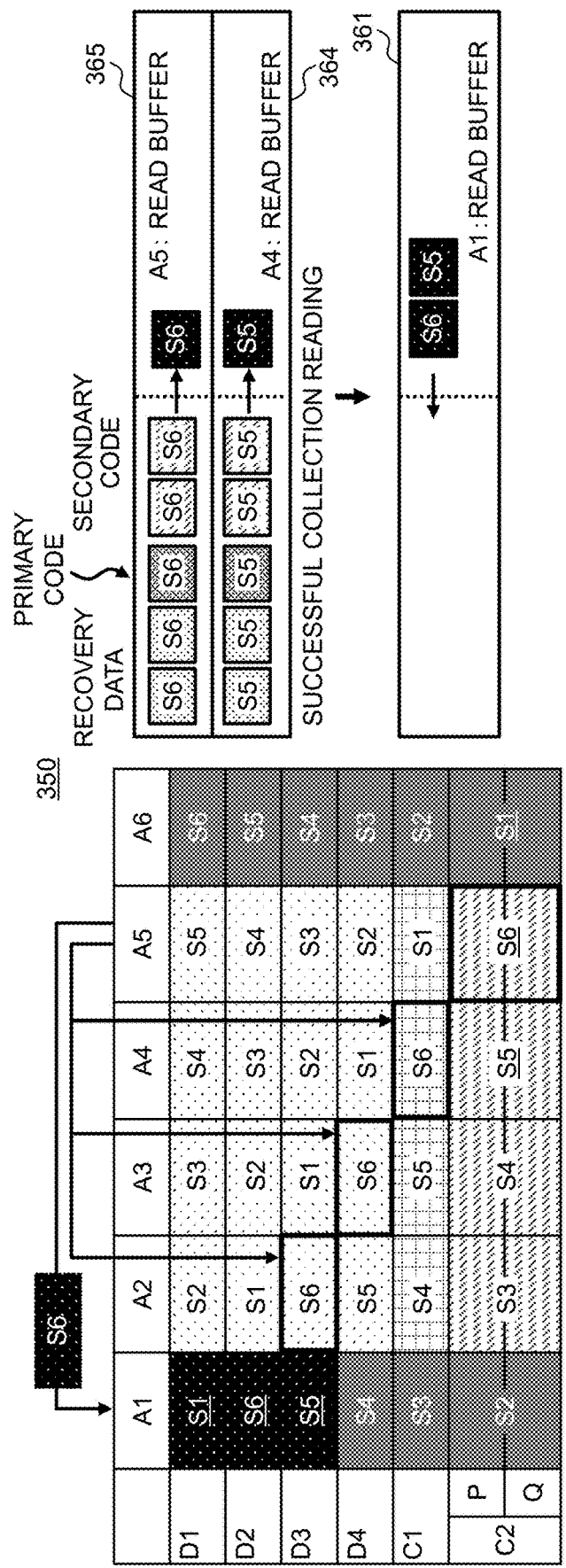
FIG. 9 is a diagram (3) for explaining a transition in the data processing when receiving the read request astride the blocks at the time of the two-point failure.

FIG. 9 is a diagram for explaining the processing transition of the collection reading requested from the node A1 to the nodes A5, A4. The stripe map 350 in FIG. 9 shows, with solid lines with arrows, a flow of the data processing associated with the collection read request to the node A5 to recover the user data S6 of A1 D2 from the secondary code. The node A5 which has received the collection read request by means of the secondary code S6 from the node A1 reads the user data S6 (A2D3: S6, A3D4: S6), which is recovery data, from the nodes A2, A3 and reads the primary code S6 (A4C1: S6) from the node A4. The node A5 retains these pieces of data, which are read from the other nodes, together with the secondary code S6 (A5C2: S6), which is stored in its own secondary code part, in a read buffer 365 for the node A5. Incidentally, since the secondary code has the size of two blocks P and Q, the secondary code S6 in the read buffer 365 in FIG. 9 is indicated with two data blocks (which are illustrated in the same manner in other drawings). Then, the collection read processing program 155 of the node A5 recovers the user data S6 from the five-block data retained in the read buffer 365. Furthermore, similar collection reading is also performed at the node A4 which has received the collection read request by means of the secondary code S5 and the user data S5 is recovered from five-block data (A2D5: S5, A5D1: S5, A3C1: S5, and A4C2: S5) retained in a read buffer 364 for the node A4. Then, the user data S6, S5 which are recovered at the node A5, A4, respectively, are transmitted to the node A1 and are retained in a read buffer 361 for the node A1.

FIG. 10 is a diagram for explaining the processing transition of collection reading which is requested from the node A1 to the node A6. Referring to FIG. 10, the collection reading by means of the secondary code is requested from the node A1 to the node A6; however, the device of the node A6 is in a blocked state as in the node A1, so that the secondary code cannot be read and the collection reading fails. In this case, in the flowchart in FIG. 6, it is determined as NO in step S105 and the processing proceeds to step S106. Incidentally, it is recognized that the devices of the node A1 and the node A6 are in the blocked state at the time point illustrated in FIG. 10 (the two-point failure has occurred).

Furthermore, as illustrated in FIG. 7, the target range (reading range) of the user data S1 regarding the read request extends not fully, but partly over the relevant block, so that in the case of this example, the collection read request regarding the node A1 to the node A6 as illustrated in FIG. 10 is executed by targeting at a "partial secondary code S1" corresponding to the user data S1 of the reading range. The partial read request range of the secondary code S1 regarding the collection read request may be, for example, determined with reference to an offset at one end on the S1 side of the target range of the read request.

Figure 11:
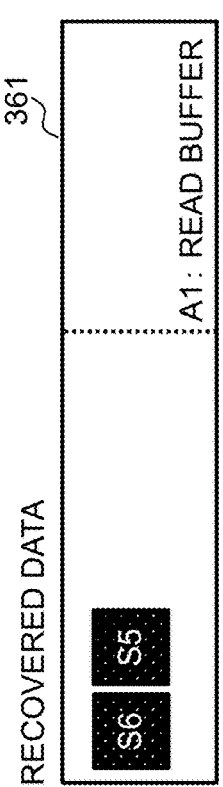
FIG. 11 is a diagram (5) for explaining a transition in the data processing when receiving the read request astride the blocks at the time of the two-point failure.

In the processing in and after step S106, the recovery is performed from the primary code with respect to the user data S1 as explained with reference to FIG. 6. FIG. 11 illustrates a processing image of switching to the recovery from the primary code with regard to the user data S1 when the recovery from the secondary code has failed. The necessary data at the node A1 to recover the user data S1 from the primary code is the user data S6, S5, S4, and the primary code S3 as these pieces of data in the stripe map 350 in FIG. 11 are surrounded by a broken line. The user data S6, S5 are already retained in the read buffer 361 for the node A1 by the collection reading as explained with reference to FIG. 9; however, the user data S4 and the primary code S3 are not retained in the read buffer 361 yet and, therefore, these pieces of data are insufficient data for the recovery of the user data S1 from the primary code.

Figure 12:
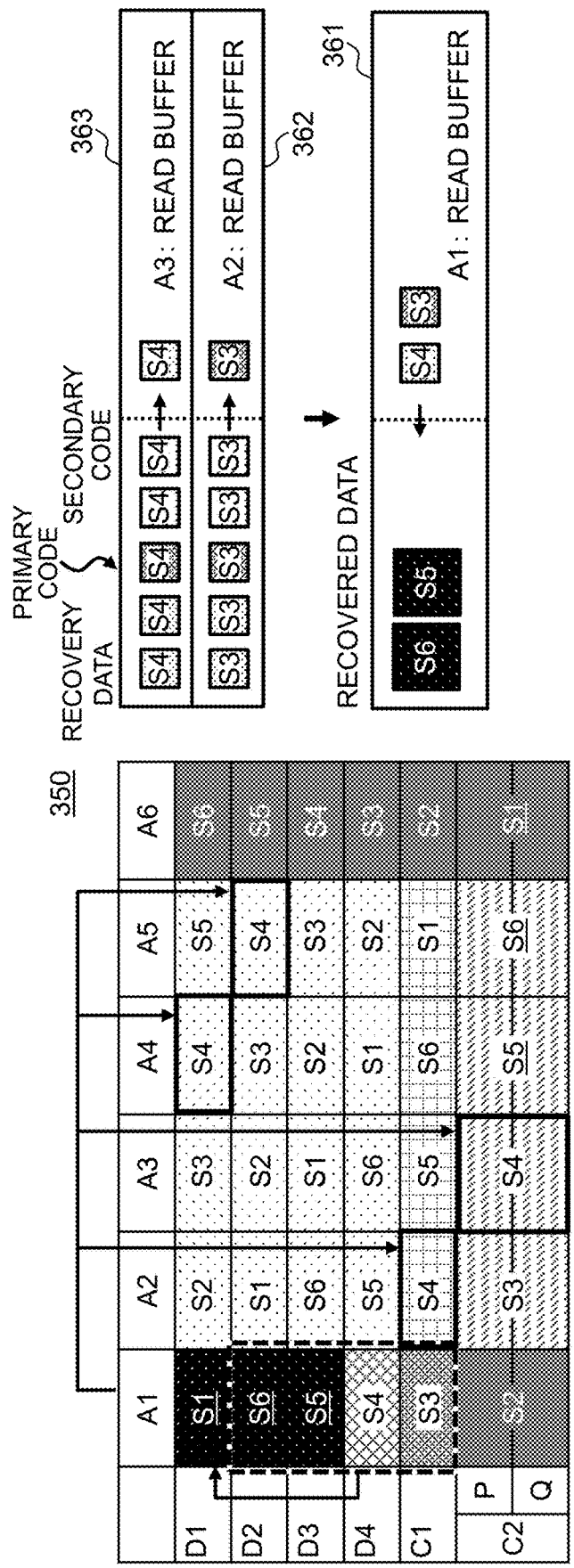
FIG. 12 is a diagram (6) for explaining a transition in the data processing when receiving the read request astride the blocks at the time of the two-point failure.

So, in step S107 in FIG. 6, collection reading of the insufficient data (A1D4: S4, A1C1: S3) is performed to recover the user data S1 from the primary code. FIG. 12 is a diagram for explaining the processing transition of such collection reading. In the stripe map 350 in FIG. 12, a flow of data processing associated with the collection read request to the node A3 in order to recover the user data S4 from the secondary code S4 is indicated with solid lines with arrows.

Referring to FIG. 12, the node A3 which has received a collection read request for the user data S4 reads the user data S4 (A4D1: S4, A5D2: S4), which is recovery data, from the nodes A4, A5 and reads the primary code S4 (A2C1: S4) from the node A2. The node A3 retains these pieces of data, which have been read from the other nodes, together with the secondary code S4 (A3C2: S4), which is stored in its own secondary code part, in the read buffer 363 for the node A3 and recovers the user data S4 from these pieces of the retained data. Then, the recovered user data S4 is transmitted to the node A1 and retained in the read buffer 361 for the node A1. Furthermore, the collection reading similar to the above-described collection reading is also performed at the node A 2 which has received a collection read request for the primary code S3; the primary code S3 is recovered from the data (A3D1: S3, A4D2: S3, A5D3: S3, A2C2: S3) retained in the read buffer 362 for the node A2; and the recovered primary code S3 is transmitted to the node A1 and retained in the read buffer 361 for the node A1.

Incidentally, the target range (the reading range) of the user data S1 regarding the read request extends not fully, but partly over the relevant block as described earlier, so that in this example, it is assumed that the data reading range of the data requested by the collection reading of the user data S4 and the primary code S3 extends not fully, but partly over the relevant block (for example, offsets are aligned). In order to visually express such partial target data, other data are displayed in a smaller size than that of the user data S6, S5 which are recovered in block units in each read buffer in FIG. 12.

Figure 13:
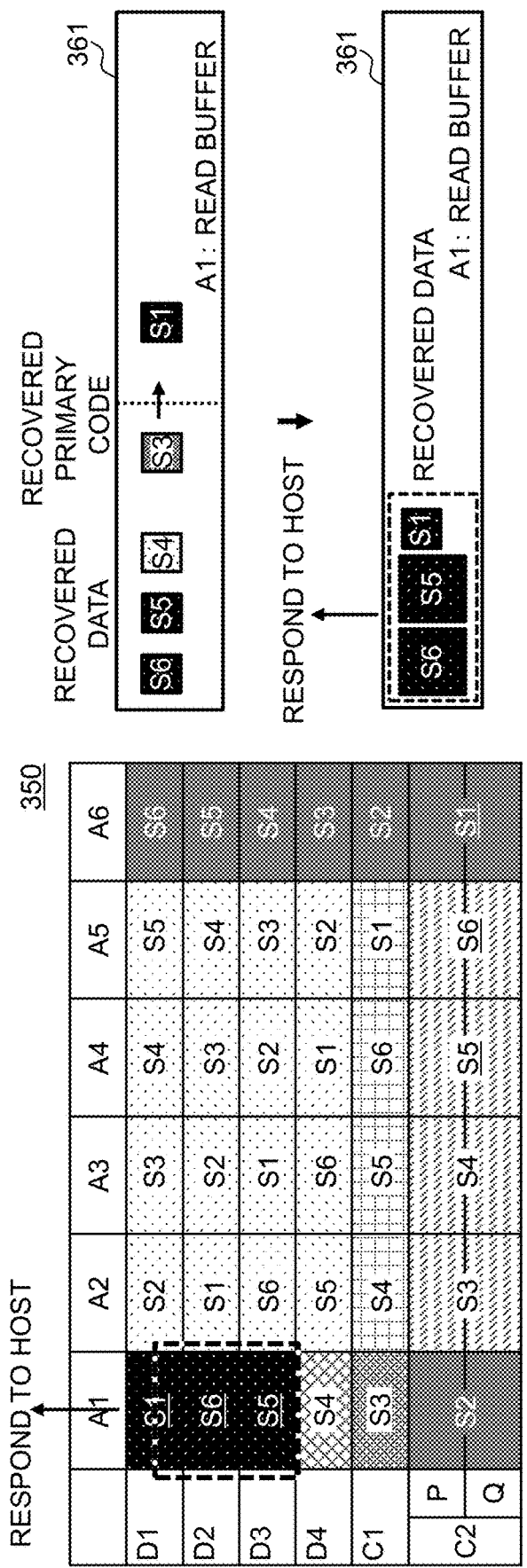
FIG. 13 is a diagram (7) for explaining a transition in the data processing when receiving the read request astride the blocks at the time of the two-point failure.

FIG. 13 is a diagram for explaining a processing transition following FIG. 12. As a result of the collection reading which has been explained with reference to FIG. 12, the read buffer 361 for the node A1 retains the user data S4 and the primary code S3 in addition to the user data S5, S6 which have already been stored. Then, as illustrated in FIG. 13, the node A1 can recover the user data S1 by performing the data recovery by means of the primary code by using these pieces of data retained in the read buffer 361 (step S108 in FIG. 6). The recovered user data is retained in the read buffer 361. Then, as a result of the above, the target data of the read request (the recovered user data S1, S6, S5) are retained in the read buffer 361 for the node A1, so that the node A1 transmits these pieces of data to the host and replies to the host regarding the read request.

As explained above with reference to FIG. 7 to FIG. 13, the distributed storage system 1 according to this embodiment can recover the data by using the collection reading and meet the read request by executing the data processing according to the flowchart for the data processing in FIG. 6 even if the storage device(s) to store the read request target data is blocked with respect to the read request astride the plurality of blocks upon the occurrence of the two-node failure.

(4) Read Request Range of Collection Reading

Regarding the data processing with respect to a read request(s) according to this embodiment as illustrated in FIG. 6, there is a possibility that a first-time collection read request (step S104) for the data recovery from the secondary code and a second-time collection read request (step S107: a second-time request) for the data recovery from the primary code may be executed as the collection read request (s) by means of the secondary code (for the secondary code part). The processing program 152 for the node 100 (for example, the node A1) which has received the read request from the host issues these two collection read requests by designating a read request range; and under this circumstance, the distributed storage system 1 can prepare two patterns of the read request range (first and second read request range patterns). Features and effects of each of the read request range patterns will be explained below with reference to FIG. 14 to FIG. 17.

Figure 14:
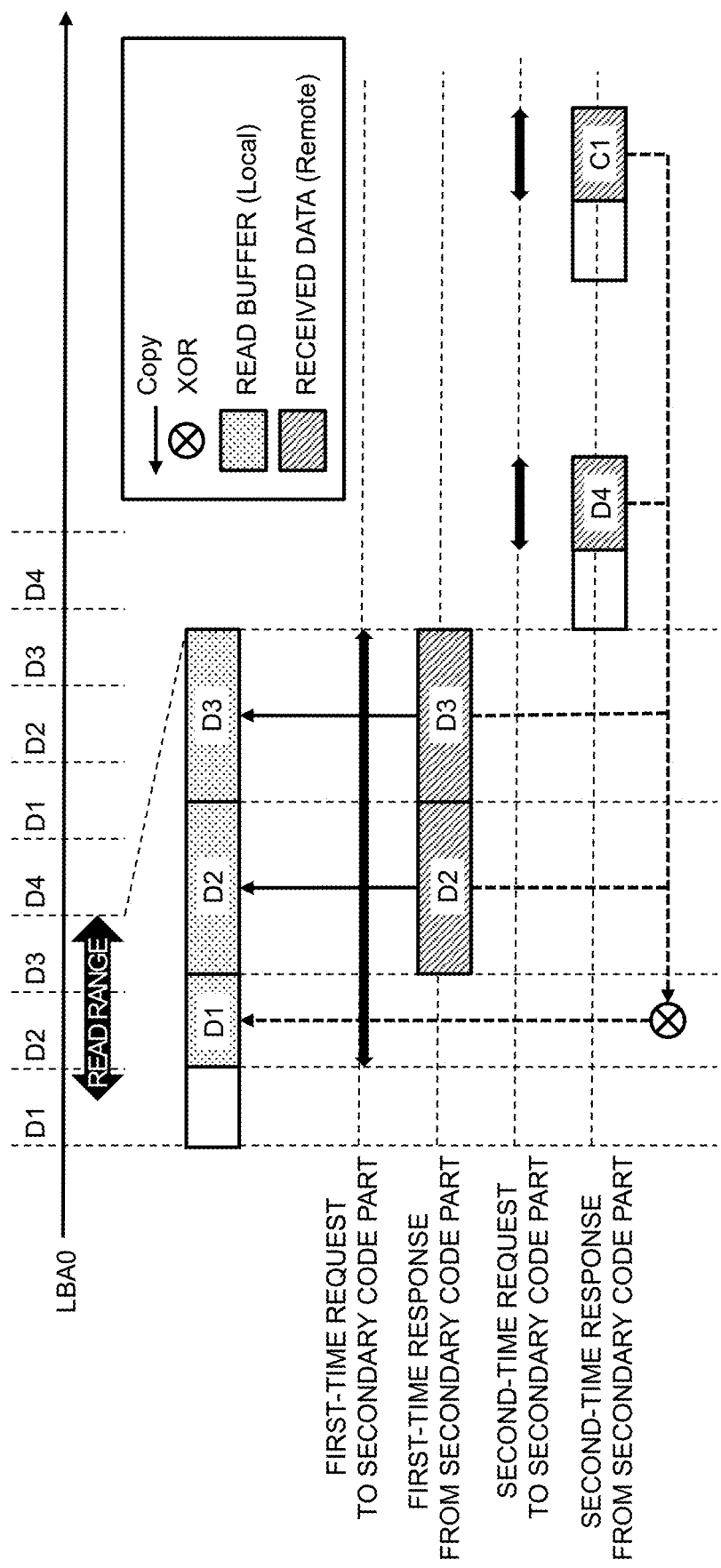
FIG. 14 is a diagram (1) for explaining a data reading range when using a first read request range pattern in the data processing.
Figure 15:
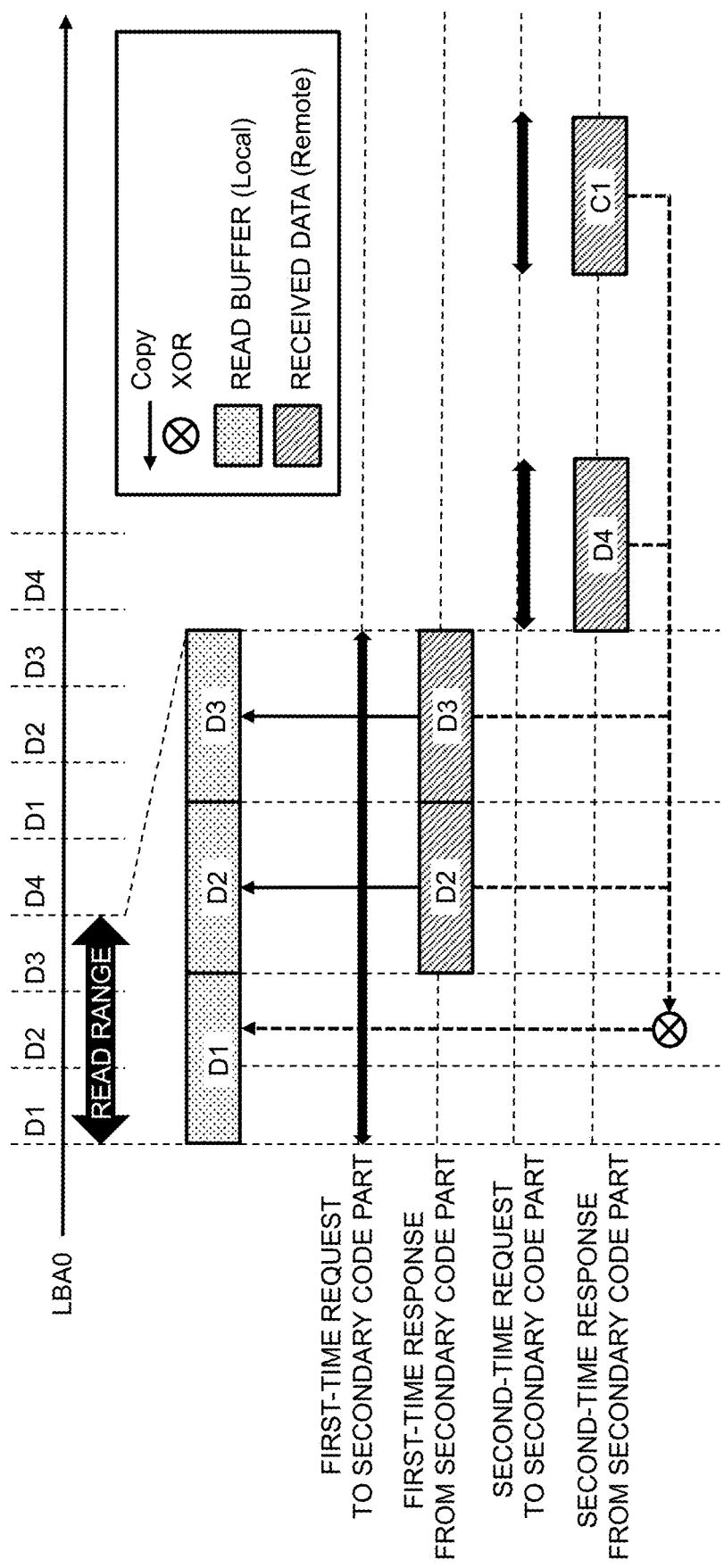
FIG. 15 is a diagram (2) for explaining the data reading range when using the first read request range pattern in the data processing.
Figure 16:
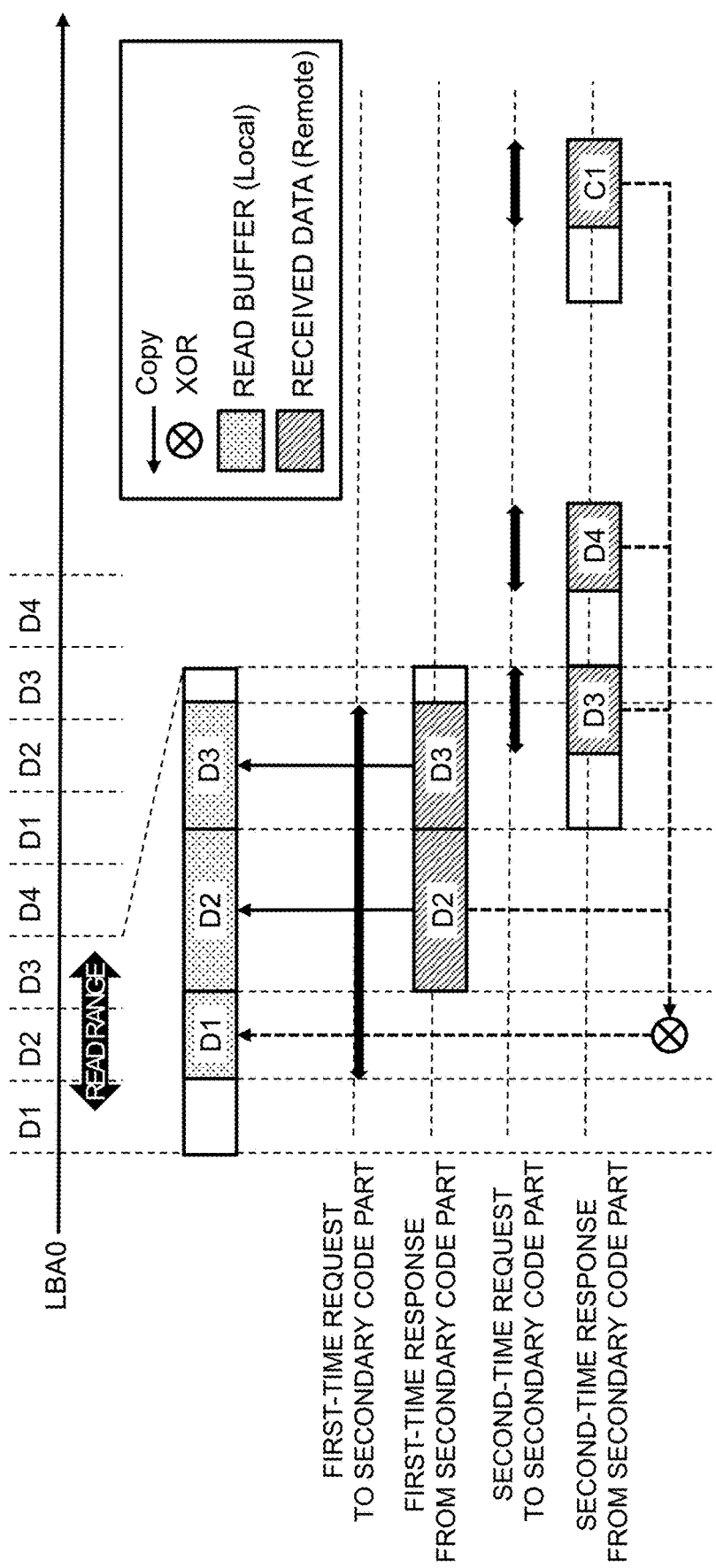
FIG. 16 is a diagram (3) for explaining the data reading range when using the first read request range pattern in the data processing.

FIG. 14 to FIG. 16 are diagrams (1) to (3) for explaining the data reading range when using the first read request range pattern in the data processing. Specifically, FIG. 14 illustrates an image of the case where one end of the target range of the read request astride the plurality of blocks is in an intermediate part of the relevant block, and this case corresponds to the processing for the specific example explained with reference to FIG. 7 to FIG. 13. Furthermore, FIG. 15 illustrates an image of the case where the target range of the read request astride the plurality of blocks is in block units; and FIG. 16 illustrates an image of the case where each of both ends of the target range of the read request astride the plurality of blocks is in an intermediate part of the relevant block.

The first read request range pattern is to make the first-time collection read request by designating the read request range corresponding to the target range of the read request as described earlier in the specific example with reference to FIG. 7 to FIG. 13.

For example, referring to FIG. 14, the read request target range (the reading range) extends from D1 to D3; and while the entire blocks of D2, D3 are targeted, only a partial range of D1 less than a block unit is designated regarding D1. In this case, the first-time collection read request to the secondary code part (step S104 in FIG. 6) is executed by setting a range similar to the read request target range as a read request range. In the case of FIG. 14, D1 cannot be read (or recovered) by the first-time collection read request as described earlier and the second-time collection read request (step S107 in FIG. 6) for the data recovery from the primary code is executed. If the first read request range pattern is adopted, data is also requested to recover the partial user data D1 with respect to this second-time collection read request; and, therefore, specifically, the user data D4 and the primary code C1 are read in their partial range. Then, the partial D1 can be recovered by performing the data recovery by means of the primary code by using the "corresponding partial portions" of the user data D2, D3 of the entire blocks which are obtained by the first-time collection read request, and the partial user data D4 and the primary code C1 which are obtained by the second-time collection read request.

In the case as illustrated in FIG. 14, it is possible to meet the read request astride the plurality of blocks by executing the collection reading five times at maximum through the sequence of the data processing. Furthermore, since the first-time collection read request with respect to D1 and the second-time collection read request with respect to D4 and C1 are executed within the request range according to the read request target range, no collection reading occurs with respect to any excessive data area and the processing load can be reduced. Specifically speaking, if one end of the target range for the read request astride the plurality of blocks is in the intermediate part of the relevant block, the data can be read (or recovered) while suppressing the response performance degradation caused by the collection reading, by adopting the first read request range pattern and executing the data processing.

Furthermore, a case illustrated in FIG. 15 is the case where the read request target range is in block units; and in this case, it is unnecessary to pay attention to the partial reading range. As a result, in the case of FIG. 15, it is possible to meet the read request astride the plurality of blocks by executing the collection reading five times at maximum in the same manner as in the case of FIG. 14 and the data can be read (or recovered) while suppressing the response performance degradation caused by the collection reading. Incidentally, if the read request target range is in block units, the entire processing will be the same as a result even by adopting the second read request range pattern described later.

The case illustrated in FIG. 16 is the case where each of both ends of the target range for the read request astride the plurality of blocks is in the intermediate part of the relevant block; and, specifically speaking, referring to FIG. 16, regarding a read request which extends over a plurality of blocks of D1 to D3, the latter half portion of D1 and the former half portion of D3 are in the target range (the reading range). If the data processing is executed under this circumstance by adopting the first read request range pattern, the range corresponding to the partial D1 and D3 is designated as the read request range for the first-time collection read request. As a result of the first-time collection read request, the entire block of the user data D2 is recovered, only the former half portion of the user data D3 is recovered, and the user data D1 cannot be recovered. So, the second-time collection read request is performed in order to recover the latter half portion of the user data D1. Since only the former half portion of the user data D3 is recovered here (sufficient recovery is not achieved to enable the recovery of at least the entire latter half portion of the reading range of D1), it becomes necessary for the second-time collection read request to newly acquire the latter half portion of the user data D3 by designating the read request range also with respect to the latter half portion of D3 (or the difference between the necessary latter half portion and the recovered portion).

Specifically speaking, in the case illustrated in FIG. 16, it is predicted that as the first-time collection read request is executed by designating the read request range corresponding to the read request target range, the necessary data for the data recovery from the primary code (specifically speaking, the latter half portion of the user data D3) may become excessively more insufficient than the case in FIG. 14. As a result, the number of times of the execution of the second-time collection read request is increased and the read request astride the plurality of blocks is satisfied through the collection reading six times at maximum. Therefore, if the data processing is executed by adopting the first read request range pattern when each of both ends of the target range for the read request astride the plurality of blocks is in the intermediate part of the relevant blocks, there is fear that the processing load caused by the collection reading may become slightly higher. In order to solve the above-described problem, the distributed storage system 1 can adopt the second read request range pattern.

Figure 17:
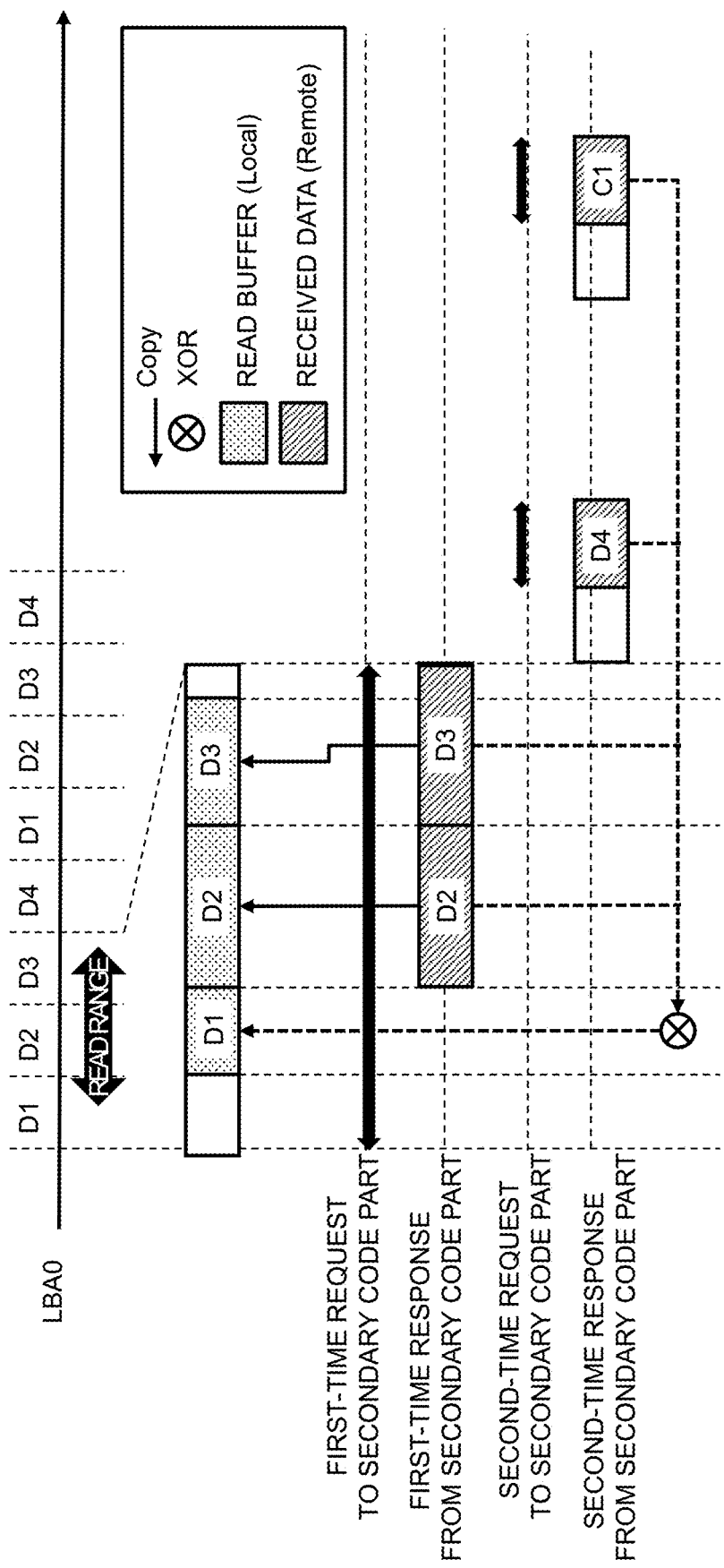
FIG. 17 is a diagram for explaining the data reading range when using a second read request range pattern in the data processing.

FIG. 17 is a diagram for explaining the data reading range when using the second read request range pattern in the data processing. Specifically speaking, FIG. 17 illustrates, in the same manner as in FIG. 16, an image of the case where each of both ends of the target range for a read request astride a plurality of blocks is in the intermediate part of the relevant block.

The second read request range pattern is to designate the read request range in block units with respect to the first-time collection read request and to designate the read request range corresponding to the read request target range with respect to the second-time collection read request.

Referring to FIG. 17, the read request target range (the reading range) extends from D1 to D3; and the latter half portion of D1 and the former half portion of D3 are in the target range in the same manner as in FIG. 16. If the second read request range pattern is adopted under this circumstance, the first-time collection read request designates each entire block of the relevant blocks as the read request range with respect all D1, D2, and D3. As a result, the user data D1 cannot be recovered, but all the entire blocks of the user data D2, D3 are recovered. Then, the second-time collection read request is executed in order to recover the partial (or latter half portion) user data D1 which is in the reading range from the primary code. Since the read request range corresponding to the read range is designated for this second-time collection read request, the latter half portion of the user data D4 and the primary code C1 are recovered. Under this circumstance, the entire block of the user data D3 has already been recovered unlike the case of FIG. 16, so that it does not have to be included in the target of the second-time collection read request. Then, the partial user data D1 can be recovered by performing the data recovery by means of the primary code by using the entire block of the user data D2 and the "corresponding partial portion" of D3 which are obtained by the first-time collection read request, and the partial user data D4 and the primary code C1 which are obtained by the second-time collection read request.

In the case of FIG. 17 as described above, it is possible to meet the read request astride the plurality of blocks by executing the collection reading five times at maximum through the sequence of the data processing. Regarding the second read request range pattern the read request range for the first-time collection read request is set to cover each entire block of the relevant blocks and it is thereby predicted that as compared to the first read request range pattern, the processing load may increase as much as the execution of the collection reading at least once with respect to the data area exceeding the read request target range. However, on the other hand, the second-time collection read request does not perform the collection reading of the data block(s), which were successfully recovered by the first-time collection read request, again, so that it is possible to suppress any increase in the number of times of execution of the collection reading as a whole. Specifically speaking, if each of both ends of the target range for the read request astride the plurality of blocks is in the intermediate part of the relevant block, it can be said that the data can be read (or recovered) while suppressing the response performance degradation caused by the collection reading, by executing the data processing using the second read request range pattern.

When receiving a read request astride a plurality of blocks, the distributed storage system 1 according to this embodiment as described above can recover and read the data while suppressing the response performance degradation caused by the collecting reading, even upon the occurrence of the two-node failure by executing the data processing in FIG. 6 using the first read request range pattern or the second read request range pattern. Incidentally, which one of the first read request range pattern and the second read request range pattern should be adopted may be set in advance, or the processing program 152 of the node 100 which has received the read request may select whichever preferable pattern according to the reading range of the read request. Specifically speaking, when one end of the read request target range is in the intermediate part of the relevant block or when the read request target range extends over each entire block of the relevant blocks, the first read request range pattern should preferably be adopted; and when each of both ends of the read request target range is in the intermediate part of the relevant blocks, the second read request range pattern should preferably be adopted.

The distributed storage system 1 according to this embodiment: is a distributed storage system product which binds, for example, arbitrary general-purpose servers together via software to create one storage pool so that the user can cut out and use an arbitrary capacity from the storage pool; and is suited for application to a distributed storage system product which requires high I/O performance, for example, as it is difficult to be used for mission critical usage and is particularly used for large-scaled data analysis. Since the number of servers for the above-described distributed storage system product is relatively large, the redundancy tends to easily degrade; however, this distributed storage system product is not used for the mission critical usage and, therefore, it is predicted that such distributed storage system product easily tends to continue being operated without undergoing maintenance immediately even in a state of the redundancy degradation. By placing the user data and the redundant codes (the primary code and the secondary code) in the distributed storage system product having the above-described features in consideration of implementation, the distributed storage system 1 according to this embodiment can read the data while suppressing the response performance degradation caused by the collection reading upon the read request even in the state of the redundancy degradation like the occurrence of the two-point failure; and, therefore, it is possible to maintain practical performance and implement reading and recovery of the data.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, another configuration can be added to, deleted from, or replaced with part of the configuration of an embodiment.

Furthermore, each of the aforementioned configurations, functions, processing units, processing means, etc. may be implemented by hardware by, for example, designing part or all of such configurations, functions, processing units, and processing means by using integrated circuits or the like. Moreover, each of the aforementioned configurations, functions, etc. may be realized by software by processors interpreting and executing programs for realizing each of the functions. Information such as programs, tables, and files for realizing each of the functions may be retained in memories, storage devices such as hard disks and SSDs (Solid State Drives), or storage media such as IC cards, SD cards, and DVDs.

Furthermore, control lines and information lines which are considered to be necessary for the explanation are illustrated in the drawings; however, not all control lines or information lines are necessarily indicated in terms of products. Practically, it may be assumed that almost all components are connected to each other.

REFERENCE SIGNS LIST

1: distributed storage system
100: computer node (node)
110: processor package
120: drives
130: backend port
140: processor
150: memory
151: management information
152: processing program
153: cache information
154: stripe map
155: collection read processing program
200: computer domain
210, 220, 230: networks

The invention claimed is:

1. A distributed storage system, comprising:
a plurality of nodes coupled via a network, each node includes a processor for controlling data I/O, a cache and a storage device data,
wherein each node stores a plurality of blocks of user data, a primary redundant code and a secondary redundant code,
wherein when receiving a write request from a host, a first node of the plurality of nodes:
generates a first primary redundant code on the basis of a plurality of pieces of user data received together with the write request, the plurality of pieces of user data respectively correspond to first blocks of user data stored in the first node; and
transmits the generated first primary redundant code and the plurality of pieces of user data used to generate the primary redundant code to other respectively different nodes of the plurality of nodes which respectively store the plurality of pieces of the received user data in the respective storage devices of the other respectively different nodes;
wherein a second node of the plurality of nodes:
generates a first secondary redundant code based on the first primary redundant code and pieces of user data transmitted from nodes other than the first node of the plurality of nodes; and
stores the generated first secondary redundant code in the storage device of its own node and saves the first primary redundant code, which is used to generate the first secondary redundant code, in the cache of its own node;
wherein each node of the plurality of nodes has functions as the first node and the second node;
wherein if the first node receives a read request from the host to read target user data when the storage device of the first node is blocked,
the first node executes a first collection read request, which issues first read requests to other nodes having respective secondary redundant codes respectively corresponding to the target user data of the read request stored in the first node, and
wherein if at least one block of the target user data has failed to be recovered according to the first collection read request, the first node determines the remaining blocks of user data necessary to restore the target user data and executes a second collection read request which issues second read requests to recover the remaining blocks using the first primary generated code, the second read requests being transmitted by the first node to other nodes having secondary redundant codes corresponding to the remaining blocks of user data in the first node.

2. The distributed storage system according to claim 1, wherein when a target range of the read request extends over a plurality of data blocks,
the first node which has received the read request executes the first collection read request to recover the target user data with respect to each of the data blocks.

3. The distributed storage system according to claim 2, wherein when the target range includes a part of a data block regarding the read request, the target range of which extends over the plurality of data blocks,
the first node which has received the read request executes the second collection read request by designating a request range corresponding to the part with respect to the recovery of the target user data corresponding to the part of the data block.

4. The distributed storage system according to claim 3, wherein regarding the read request, the target range of which extends over the plurality of data blocks, if one end of the target range extends to a part of a data block,
the first node which has received the read request executes the first collection read request by designating a request range corresponding to the part with respect to the recovery of the target user data corresponding to the part of the data block.

5. The distributed storage system according to claim 3, wherein regarding the read request the target range of which extends over the plurality of data blocks, if each of both ends of the target range extends to a part of a data block,
the first node which has received the read request executes the first collection read request by designating each entire block of the relevant data blocks with respect to the recovery of the target user data corresponding to the part of the data block.

6. The distributed storage system according to claim 1, wherein if the first node receives a data read request from the host when the storage device of its own node is not blocked,
the first node replies to the host by reading target user data of the read request from the storage device of its own node.

7. A data recovery method by a distributed storage system, the distributed storage system including a plurality of nodes coupled together via a network, each node of the plurality of nodes includes a processor for controlling data I/O, and a cache and a storage device for storing data, and each node stores a plurality of blocks of user data, a primary redundant code and a secondary redundant code, the method comprising:
- when receiving a write request from a host, a first node of the plurality of nodes:
- generating a first primary redundant code on the basis of a plurality of pieces of user data received together with the write request, the plurality of pieces of user data respectively correspond to first blocks of user data stored in the first node; and
- transmitting the generated first primary redundant code and the plurality of pieces of user data used to generate the primary redundant code to other respectively different nodes of the plurality of nodes which respectively store the plurality of pieces of the received user data in the respective storage devices of the other respectively different nodes;
- wherein a second node of the plurality of nodes:
- generating a first secondary redundant code based on the first primary redundant code and pieces of user data transmitted from nodes other than the first node of the plurality of nodes; and
- storing the generated first secondary redundant code in the storage device of its own node and saves the first primary redundant code, which is used to generate the first secondary redundant code, in the cache of its own node;
- wherein each node of the plurality of nodes has functions as the first node and the second node;
- wherein if the first node receives a read request from the host to read target the user data when the storage device of the first node is blocked,
- the first node executing a first collection read request, which issues first read requests to other nodes having respective secondary redundant codes respectively corresponding to the target user data of the read request stored in the first node; and
- wherein if at least one block of the target user data has failed to be recovered according to the first collection read request, the first node determines the remaining blocks of user data necessary to restore the target user data and executes a second collection read request which issues second read requests to recover the remaining blocks using the first primary generated code, the second read requests being transmitted by the first node to other nodes having secondary redundant codes corresponding to the remaining blocks of user data in the first node.

8. A non-transitory computer readable medium storing a data processing program to be executed by a plurality of nodes in a distributed storage system, wherein each node of the plurality of nodes includes a processor for controlling data I/O, and a cache and a storage device for storing data, wherein each node stores a plurality of blocks of user data, a primary redundant code and a secondary redundant code, the processing program executing steps comprising;
- wherein when receiving a write request from a host, the data processing program causes a first node of the plurality of nodes to execute processing for:
- generating a first primary redundant code on the basis of a plurality of pieces of user data received together with the write request, the plurality of pieces of user data respectively correspond to first blocks of user data stored in the first node; and
- transmitting the generated first primary redundant code and the plurality of pieces of user data used to generate the primary redundant code to other respectively different nodes which respectively store the plurality of pieces of the received user data in the respective storage devices of the other respectively different nodes;
- wherein the data processing program causes a second node of the plurality of nodes to execute processing for:
- generating a first secondary redundant code based on the first primary redundant code and pieces of user data transmitted from nodes other than the first node of the plurality of nodes; and
- storing the generated first secondary redundant code in the storage device of its own node and saving the first primary redundant code, which is used to generate the first secondary redundant code, in the cache of its own node;
- wherein if the first node receives a read request from the host to read target user data when the storage device of the first node is blocked,
- wherein the data processing program causes the first node to execute processing for executing a first collection read request, which issues first read requests to other nodes having respective secondary redundant codes respectively corresponding to the target user data of the read request stored in the first node and
- wherein if at least one block of the target user data has failed to be recovered according to the first collection read request, the first node determines the remaining blocks of user data necessary to restore the target user data and executes a second collection read request which issues second read requests to recover the remaining blocks using the first primary generated code, the second read requests being transmitted by the first node to other nodes having secondary redundant codes corresponding to the remaining blocks of user data in the first node.

\* \* \* \* \*